(12) United States Patent
Murudkar et al.

(10) Patent No.: US 12,518,478 B2
(45) Date of Patent: Jan. 6, 2026

(54) METHODS AND SYSTEMS FOR INSTANCE-WISE SEGMENTATION OF A 3D POINT CLOUD BASED ON SEGMENTED 2D IMAGES

(71) Applicant: Verizon Patent and Licensing Inc., Basking Ridge, NJ (US)

(72) Inventors: Adwait Ashish Murudkar, Somerville, NJ (US); Nikhil Sadashiv Pantpratinidhi, El Dorado Hills, CA (US); Sergey Virodov, San Diego, CA (US); Stephen Cole, Northbrook, IL (US); Vidhya Seran, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 224 days.

(21) Appl. No.: 18/237,348

(22) Filed: Aug. 23, 2023

(65) Prior Publication Data
US 2025/0069324 A1 Feb. 27, 2025

(51) Int. Cl.
*G06T 17/00* (2006.01)
*G06T 7/12* (2017.01)
*G06V 10/46* (2022.01)
*G06V 20/70* (2022.01)
*H04N 13/351* (2018.01)

(52) U.S. Cl.
CPC ............... *G06T 17/00* (2013.01); *G06T 7/12* (2017.01); *G06V 10/46* (2022.01); *G06V 20/70* (2022.01); *H04N 13/351* (2018.05); *G06V 2201/07* (2022.01)

(58) Field of Classification Search
CPC . G06T 17/00; G06T 7/12; G06T 2207/10028; G06V 10/46; G06V 20/64; G06V 20/70; G06V 2201/07; H04N 13/351
See application file for complete search history.

(56) References Cited

U.S. PATENT DOCUMENTS

| | | | |
|---|---|---|---|
| 9,466,143 B1 * | 10/2016 | Walvoord | G06T 7/579 |
| 10,067,509 B1 * | 9/2018 | Wang | G05D 1/0231 |
| 2022/0309703 A1 * | 9/2022 | Kim | G06V 10/245 |
| 2024/0078787 A1 * | 3/2024 | Taghavi | G06V 10/762 |
| 2024/0212164 A1 * | 6/2024 | Li | G06T 7/11 |

* cited by examiner

*Primary Examiner* — Sing-Wai Wu

(57) ABSTRACT

An illustrative point cloud segmentation system generates an instance-wise semantic mask for a particular source image of a set of source images that has been used to construct a 3D point cloud representing a scene that includes one or more objects. The point cloud segmentation system maps a set of 3D points from the 3D point cloud to corresponding 2D points of the particular source image, then labels, based on contours defined by the instance-wise semantic mask to demarcate the one or more objects, the mapped set of 3D points in accordance with where the corresponding 2D point for each mapped 3D point is positioned with respect to the contours. Based on the labeling of the mapped 3D points, the point cloud segmentation system produces a segmented 3D point cloud including an instance-wise segmentation of the one or more objects at the scene. Corresponding methods and systems are also disclosed.

20 Claims, 11 Drawing Sheets

METHODS AND SYSTEMS FOR INSTANCE-WISE SEGMENTATION OF A 3D POINT CLOUD BASED ON SEGMENTED 2D IMAGES

BACKGROUND INFORMATION 3D point clouds are collections of points in three-dimensional space that represent surfaces of objects in that space. For example, object surfaces may be scanned or otherwise analyzed (e.g., using laser scanning, photogrammetry, structured light scanning, or other suitable methods) and 3D point clouds representing the surfaces may be generated as a product of such scans or analyses. Point clouds may be useful for a variety of applications, including, for example, virtual and augmented reality applications (e.g., for entertainment, training, education, etc.), 3D printing and/or product design applications, navigation applications (e.g., collision detection for self-driving vehicles, robotics, etc.), and general 3D modeling applications of various other types.

In some of these applications, a 3D point cloud of a scene may incorporate a variety of different objects at the scene. In such applications, a use case may be best served if the objects are segmented and differentiated from one another (e.g., so as to be clearly distinguishable and/or individually manipulable) in the point cloud representation. However, while powerful technologies and tools exist for performing 2D image segmentation of certain classes of objects (e.g., segmentation networks and/or other machine learning models configured to perform segmentation of common and well-studied types of objects such as human bodies), the segmentation of 3D point clouds is a far less developed field that presents many challenges, particularly for objects that are not as common or frequently modeled.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
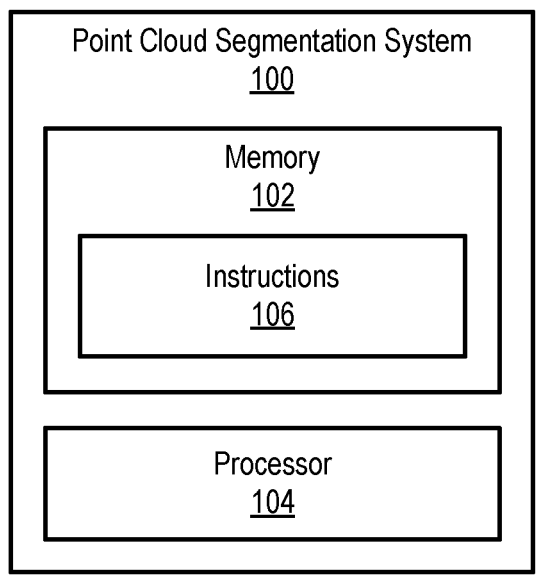
FIG. 1 shows an illustrative point cloud segmentation system for instance-wise segmentation of a 3D point cloud based on segmented 2D images in accordance with principles described herein.

Methods and systems for instance-wise segmentation of a 3D point cloud based on segmented 2D images are described herein. As mentioned above, certain applications that make use of 3D point clouds may be best served when objects of interest represented within the point clouds can be distinguished from other classes objects (e.g., objects that are not of interest in the application) and even from one another (e.g., from other instances of the same object class). The process of differentiating content of interest (e.g., representations of particular objects) from other content depicted in an image is referred to as "semantic segmentation" (or simply "segmentation") and is generally a more complex task than mere image classification, since it involves not only identifying what object or objects are depicted but also which pixels of the image contribute to object depictions (and which pixels do not). For example, a semantic segmentation of a 2D image that depicts an object of interest may involve identifying and labeling which pixels, within the 2D image, are part of the depiction of the object of interest and which pixels are not. In the case of an image that depicts several objects of the same object class (e.g., several individual people, etc.), a basic semantic segmentation may involve distinguishing pixels that are part of any depictions of the human body from pixels that are not (e.g., assigning one type of label to all pixels depicting person A or person B, and assigning another type of label to all the other pixels). Alternatively, an "instance-wise" segmentation of such an image may further distinguish pixels of each instance of that object class (e.g., assigning a first type of label to pixels depicting person A, a second type of label to pixels depicting person B, and a third type of label to other pixels that do not depict any object in the human body object class).

Just as the basic and instance-wise semantic segmentation described above may be useful for applications involving 2D images, basic and/or instance-wise semantic segmentation may similarly be desirable for 3D point clouds in certain applications. As one example use case that will be referred to throughout the following description, it may be desirable to generate a 3D point cloud of objects that need to be monitored and managed by a user, but that happen to be located in a relatively inaccessible location. For instance, a cell tower may be designed to hold a variety of radio antennas high off the ground so that they may be able to communicate with user equipment devices in the area. It may be desirable for these antenna objects to be monitored (e.g., to check if they are affected by storms or other weather, to ensure that they are not compromised by wildlife or unauthorized parties, etc.) as well as modeled for other purposes (e.g., to measure the dimensions of the objects, to assess how closely they are placed to one another or to other objects on the tower so as to determine if there is space for additional equipment, etc.). While it may not be particularly easy or convenient for technicians and others to physically visit the tops of cell towers to perform such monitoring in person, machines such as drones may be used to collect images of the antennas that may then be used to generate 3D point clouds and/or other types of 3D representations of the objects. By semantically segmenting these point clouds (e.g., by instance-wise segmentation in certain examples), users on the ground or in other locations far away from the cell towers would be able to conveniently view the different objects of interest (e.g., individual radio antennas and/or other equipment present on a given cell tower platform) based on the segmented 3D models rather than needing to either visit the objects in person or rely on 2D images of the objects.

While cell towers and radio antennas and equipment provide a convenient example for discussion and illustration purposes in this disclosure, it will be understood that various other types of applications also making use of 3D point clouds may benefit from the same principles described herein for instance-wise segmentation of 3D point clouds based on segmented 2D images. For example, other objects that need to be monitored but that are in difficult to reach places (e.g., bridges, ships, buildings, other architectural structures, etc.) may similarly benefit from principles described herein. Even in use cases where the objects of interest are common and/or easily accessible (e.g., virtual or augmented reality applications that involve generating 3D point clouds and other 3D representations of scenes that are convenient to capture such as scenes immediately surrounding the user), principles described herein for instance-wise segmentation of 3D point clouds may be beneficial in ways that will be made apparent.

While some approaches for semantically segmenting 3D point clouds with respect to certain object classes exist, there are various challenges that these approaches face that may tend to limit how effective and realistic it is to employ them under various circumstances. Among these challenges, for example, is that methods such as clustering or graph cut often require user selection of certain parameters (e.g., number of clusters, background/foreground, etc.) and do not perform well on sparse point cloud data, which may be all that is available in certain circumstances. Moreover, most modern approaches involving machine learning models require labeled 3D data for training, which may be difficult to acquire, particularly for object classes that are not commonly of interest in mainstream applications (e.g., object classes such as radio antennas, as opposed to common objects such as human subjects). For example, reliable training data may require challenging and labor-intensive annotation of real-world point clouds that have been captured (e.g., simulated or synthesized point clouds may not be sufficient for training a reliable model), which may be a significant undertaking if there is not already training sets available for an object class of interest.

Other challenges include that equipment required to generate high-quality, dense scans (e.g., LIDAR or other time-of-flight depth detection equipment, etc.) may be expensive and impractical or out of reach for many use cases. At the same time, alternative approaches for generating point cloud scans (e.g., structure from motion (SfM), single or multi-view 3D reconstruction, etc.) may not produce data that is accurate or dense enough to be used as training data for reliable models. Moreover, as mentioned above, scanning and scene reconstruction may be difficult or infeasible due to physical constraints such as the scene being located in an area that is difficult or impossible for humans to access in person.

Methods and systems for instance-wise segmentation of 3D point clouds described herein address these and other challenges in various ways that will be described. As one example, the instance-wise segmentation of 3D point clouds described herein may overcome certain challenges described above by making use of segmented versions of the same 2D images that have been used to generate the 3D point clouds being semantically segmented. Many of the challenges that come into play for segmentation of 3D point clouds do not apply or have been largely solved when it comes to segmenting 2D images. For example, commercially-available 2D segmentation networks (e.g., machine learning models, deep learning models, etc.) are well established for lots of common classes of objects that may be of interest in certain use cases. Even for applications that relate to less-studied classes of objects, 2D segmentation networks configured to flexibly segment 2D images depicting all types of well-known and novel or less-known objects have become available (e.g., the Segment Anything model released by Meta, etc.) and are continuing to improve. Accordingly, as will be described and illustrated in more detail below, methods and systems described herein may utilize reliable 2D segmentation that is performed on 2D images already closely related to a 3D point cloud being segmented (e.g., because these 2D images were analyzed and used as a basis for the generation of the 3D point cloud), and marshal the insights from these segmented 2D images into determinations of how each 3D point in the point cloud is to be labeled for an instance-wise segmentation of the point cloud.

More particularly, as will be described and illustrated in detail below, a novel method for segmentation of 3D point clouds may involve steps such as the following: 1) The target scene be captured using still photos or videos. 2) 3D reconstruction may be performed using Multi-View Stereo (MVS), Structure from Motion (SfM), or other classical approaches. This may produce 2D features for each image, sparse and/or dense point clouds, as well as known correspondences between 2D and 3D points. 3) An appropriate image-based instance segmentation network may be used to produce instance-wise semantic masks for objects of interest in the images used for the 3D reconstruction. 4) Contours of the various objects that are depicted in these images may be computed for each mask. 5) A check may be performed to find 2D features (or re-projected dense points) that lie within the detected contours for each image. 6) 3D points corresponding to 2D points identified in step 5 may be extracted and labeled as belonging to the detected instance. Finally, 7) if one or more extracted point clouds overlap or have common sets of points, they may be merged into a single instance. For instance, this may be done while iterating through points and/or contours by identifying common points that have already been labeled, or it may be done by comparing bounding boxes, centroids, and/or other geometric properties after all iterations are complete (e.g., if no common points were found). These steps will be understood to represent one example algorithm. Other algorithms described and illustrated herein may include more or fewer steps, may alter the way that certain steps are performed, and so forth.

Along with overcoming the challenges described above and enabling (or making more efficient) various use cases (e.g., use cases that have been mentioned or that will be described below), various additional benefits will further be understood to arise from methods and systems described herein for instance-wise segmentation of 3D point clouds based on segmented 2D images. One such benefit provided by methods and systems described herein is that no prior labeled (or even unlabeled) 3D training data is required. Unlike approaches that rely on such 3D training data (and therefore require large amounts of difficult-to-acquire data to be created or otherwise obtained), methods and systems described herein only rely on 2D segmentation networks, which are much more readily accessible and convenient to obtain and properly train. Since segmentation of 2D image data is a well-studied field, several existing machine learning models (e.g., including image segmentation models with pre-trained weights that can be used to extract point clouds for known classes) may be available to provide highly accurate, instance-wise predictions. These models advantageously do not need to be created from scratch, even when objects of interest are relatively uncommon objects in a particular use case. Moreover, for video input data, models exist that can track instances of objects across frames, eliminating cross-image instance identification steps in the algorithm, as will be described in more detail below.

Various specific implementations will now be described in detail with reference to the figures. It will be understood that the specific implementations described below are provided as non-limiting examples and may be applied in various situations. Additionally, it will be understood that other examples not explicitly described herein may also fall within the scope of the claims set forth below. Methods and systems described herein for instance-wise segmentation of a 3D point cloud based on segmented 2D images may provide any or all of the benefits mentioned above, as well as various additional and/or alternative benefits that will be described and/or made apparent below.

FIG. 1 shows an illustrative point cloud segmentation system 100 ("system 100") configured to perform methods and processes described herein for instance-wise segmentation of a 3D point cloud based on segmented 2D images. System 100 may be implemented by computer resources such as processors, memory facilities, storage facilities, communication interfaces, and so forth, implemented on one or more computing systems described in more detail below. In some examples, system 100 (or components thereof) may be implemented by multi-access edge compute (MEC) server systems operating on a provider network (e.g., a 5G cellular data network or other carrier network, etc.), by cloud compute server systems running containerized applications or other distributed software, by on-premise server systems, by user equipment devices (e.g., mobile devices, extended reality presentation devices, etc.), by some combination of these, or by other suitable computing systems as may serve a particular implementation.

System 100 may include memory resources configured to store instructions, as well as one or more processors communicatively coupled to the memory resources and configured to execute the instructions to perform functionality described herein. For example, a generalized representation of system 100 is shown in FIG. 1 to include a memory 102 and a processor 104 selectively and communicatively coupled to one another. Memory 102 and processor 104 may include or be implemented by computer hardware that is configured to store and/or execute computer software. Various other components of computer hardware and/or software not explicitly shown in FIG. 1 (e.g., networking and communication interfaces, etc.) may also be included within system 100. In certain embodiments, memory facilities represented by memory 102 and processors represented by processor 104 may be distributed between multiple computing systems and/or multiple locations as may serve a particular implementation.

Some implementations of system 100 may, at least in certain circumstances, be configured to operate in real time so as to provide, receive, process, and/or use data described herein immediately as the data is generated, updated, changed, exchanged, or otherwise becomes available. In such examples, operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

One or more memory facilities represented by memory 102 may store and/or otherwise maintain executable data used by one or more processors represented by processor 104 to perform any of the functionality described herein. For example, as shown, memory 102 may store instructions 106 that may be executed by processor 104. Memory 102 may represent (e.g., may be implemented by) one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may represent (e.g., may be implemented by) one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when the processor is directed to perform operations represented by instructions 106 stored in memory 102), system 100 may perform functions associated with instance-wise segmentation of a 3D point cloud based on segmented 2D images in accordance with methods and systems described herein and/or as may serve a particular implementation.

Figure 2:
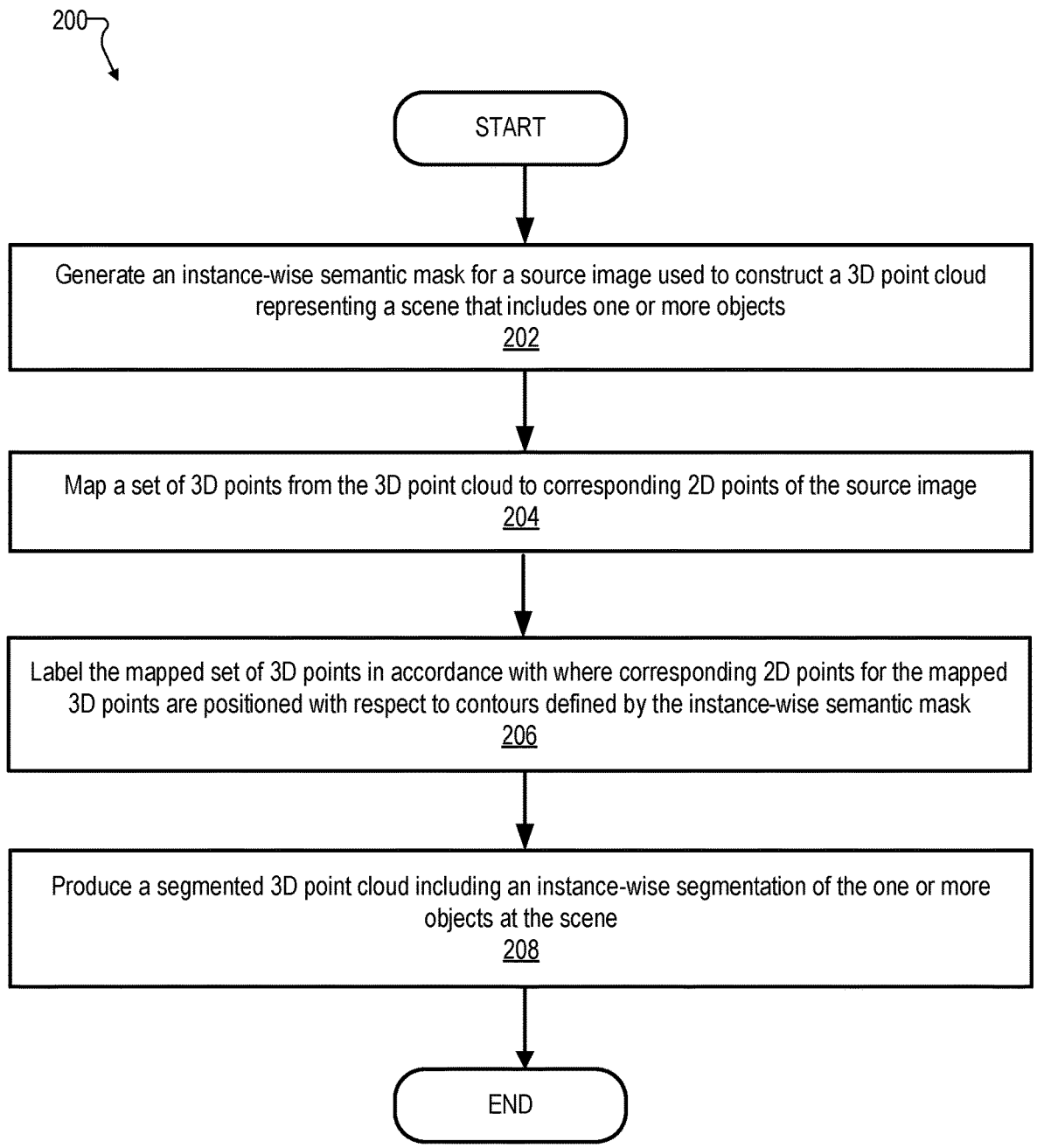
FIG. 2 shows an illustrative method for instance-wise segmentation of a 3D point cloud based on segmented 2D images in accordance with principles described herein.

As one example of functionality that processor 104 may perform, FIG. 2 shows an illustrative method 200 (also referred to as a process 200) for instance-wise segmentation of a 3D point cloud based on segmented 2D images in accordance with principles described herein. While FIG. 2 shows illustrative operations 202-208 according to one implementation, other implementations may omit, add to, reorder, and/or modify any of the operations 202-208 shown in FIG. 2. In some examples, multiple operations shown and/or described in relation to FIG. 2 may be performed concurrently (e.g., in parallel) with one another, rather than being performed sequentially as illustrated and/or described. One or more of the operations shown in FIG. 2 may be performed by a point cloud segmentation system such as system 100 and/or any implementation thereof. Each of operations 202-208 of method 200 will now be described in more detail as the operations may be performed by an implementation of system 100 (e.g., by processor 104 executing instructions 106 stored in memory 102).

At operation 202, system 100 may generate an instance-wise semantic mask for a particular source image of a set of source images that has been used to construct a 3D point cloud representing a scene that includes one or more objects. As used herein, a semantic mask may refer to a data representation produced by a semantic segmentation process. For instance, a semantic mask for a particular 2D image may be a data representation with certain similarities to the particular 2D image (e.g., it may represent the same number of rows and columns of pixels as the particular 2D image, etc.) and certain differences (e.g., rather than color data for each pixel, it may store semantic information for the corresponding pixel, such as an indication of whether the pixel does or does not depict a particular object of interest or what object instance it depicts). As mentioned above, instance-wise segmentation refers to semantic segmentation that not only differentiates objects of interest from other subject matter depicted in an image, but further differentiates different instances of the same class of object and/or different objects of different object classes from one another.

As used herein, a source image may refer to a 2D image of a scene for which a 3D point cloud is generated. The source image is so named due to its comprising "source" data on which the 3D point cloud is based. For example, based on a set of source images depicting a scene from different vantage points, suitable techniques (e.g., multi-view stereoscopic scene construction, structure from motion (SfM), etc.) may be used to construct a 3D point cloud representing the scene and the one or more objects present therein. With an understanding of this terminology, it will be understood that the generating at operation 202 of the instance-wise semantic mask for the particular source image of the set of source images may result in a set of semantic mask data that corresponds to one of several 2D images that have been captured at the scene and that, collectively, have been used to model the scene in a 3D point cloud. If this particular 2D source image happens to depict, for example, three different instances of a particular object class (e.g., three radio antennas present at the top of a cell tower in one example), this semantic mask data may then indicate which pixels of the 2D image depict a first object instance (e.g., a first antenna), which pixels depict a second object instance (e.g., a second antenna), which pixels depict a third object instance (e.g., a third antenna), and an indication that the remaining pixels depict something other than one of these three objects of interest (e.g., background content, objects that are not of interest in the given application, etc.).

At operation 204, system 100 may be configured to map a set of 3D points from the 3D point cloud to corresponding 2D points of the particular source image. For example, since the 3D point cloud was generated based on the set of source images (which includes, among other source images, the particular source image), system 100 may have ready insight into how this mapping can be accurately and efficiently performed. If the 3D point cloud is a sparse point cloud, for instance, operation 204 may involve accessing 2D-3D mapping data that is generated and stored as part of constructing the 3D point cloud based on the set of source images (e.g., a mapping of keypoints that has been stored by the scene construction algorithm). Based on this stored data, 3D points may be correlated with corresponding 2D points of the particular source image to thereby accomplish this mapping operation with no reprojection or other processing being performed. In other examples, such as if the 3D point cloud is a dense point cloud, a 2D-3D mapping may not be available (e.g., due to space constraints, etc.). In these situations, the mapping of operation 204 may include reprojecting the set of 3D points onto the particular source image (e.g., based on insights gained during the 3D point cloud construction).

As one example of such insights, the generating of the 3D point cloud based on the set of source images may involve correlating features of the various source images to a world coordinate system so that depth data for these features may be determined and a 3D point cloud may be produced relative to this world coordinate system. This scene reconstruction may be performed in accordance with any of the scene construction techniques mentioned herein (or other suitable techniques), though details of scene construction techniques are largely outside the scope of the present disclosure. Regardless of which technique is employed, system 100 may gain special insight, based on the construction of the 3D point cloud, into how 2D points in the particular image relate to 3D points in the point cloud (e.g., keypoints associated with particularly prominent features of the objects at the scene in the case of a sparse point cloud, other 3D points that may have been identified between the keypoints in the case of a dense point cloud, etc.). Based on this insight (e.g., based on a known transform between a local image space associated with the particular source image and a global coordinate space associated with the 3D point cloud, etc.), operation 204 may result in each of the set of 3D points being correlated to (e.g., projected or mapped onto) a corresponding 2D point in the particular source image. This set of 3D points may include all of the 3D points included in the 3D point cloud or a subset thereof (e.g., a subset of 3D points for which corresponding 2D points happen to be present in the particular source image, a subset of 3D points including only keypoints of the 3D point cloud and not points detected between these keypoints in the case of a dense point cloud, etc.).

At operation 206, system 100 may label the set of 3D points that were mapped onto the particular source image at operation 204 (the "mapped 3D points"). For example, this labeling may be performed based on contours defined by the instance-wise semantic mask generated at operation 202 to demarcate the one or more objects as they are depicted in the particular source image. If the particular source image were to depict two objects of interest from the scene plus a portion of a third object of interest (e.g., two radio antennas plus part of another piece of equipment of interest at a cell tower scene), the instance-wise semantic mask generated at operation 202 may indicate that certain pixels enclosed within a first contour are associated with a first object, that other pixels enclosed within a second contour are associated with a second object, that certain pixels enclosed within a third contour and a boundary of the image are associated with the partial object, and the remaining pixels of the particular image are unassociated with any of the objects of interest.

Given this example instance-wise semantic mask, this example image (the "particular source image" of the set of source images), these example contours for these example object depictions, and the mapping of this example set of 3D points, system 100 may be configured to label each mapped 3D point in the set in accordance with where it is positioned with respect to the contours. For example, if a first 3D point is mapped to be positioned within the first contour, that 3D point may be labeled as being semantically related to the first object. Similarly, if another 3D point is mapped onto the particular image at a position enclosed by the second contour, that 3D point would be labeled as corresponding to the second object, and so forth. The labeling at operation 206 may be performed in any suitable way so as to indicate the semantic information for each pixel in accordance with any suitable data format or protocol. For example, along with 3D coordinates and/or other information already represented for each 3D point in a point cloud data structure (e.g., a file representing the 3D point cloud), each 3D point may further be made to represent additional information indicative of which object it is associated with.

At operation 208, system 100 may then produce a segmented 3D point cloud based on the labeling of the mapped set of 3D points at operation 206. For example, if each 3D point in the set of 3D points of the point cloud has been labeled as having a correspondence to one particular object of the one or more objects of interest at the scene, the segmented 3D point cloud produced at operation 208 may include the original point cloud data along with the semantic labels that have been generated.

In certain examples, additional complexity may be addressed at operation 208. For example, since certain 3D points may be mapped onto multiple source images of the set of source images (given that certain source images may overlap to show the same objects, etc.), there may be some overlap and merging of objects that is performed at this stage. For example, as will be described in more detail below, a 3D point may be labeled to be associated with "object 1" in the local object space of a first image and then labeled to be associated with "object 2" in the separate local object space of a second overlapping image. The merging of objects that takes place (e.g., as part of operation 208 or as a separate operation) may involve a determination, based on context clues or other techniques described in more detail below, that "object 1" of the first image is the same object instance as "object 2" of the second image. Accordingly, the 3D point in question may be assigned (labeled with an association) to a particular object identification in a global object space for the 3D point cloud. Along with object merging, other optional steps or operations not explicitly shown in method 200 may also be performed as may serve a particular implementation. Certain of these operations will be described or made apparent in the disclosure below and it will be understood that these may improve the performance (e.g., accuracy, efficiency, etc.) of the segmentation in various ways.

It is noted that while method 200 refers only to a minimalist set of individual components, operations 202-208 may be understood to be performed repeatedly and/or more broadly so as to similarly incorporate other like components as may serve a particular implementation. For example, while operation 202 refers only to an individual instance-wise semantic mask, operation 204 refers only to a particular source image of the set source of images, and other operations of process 200 similarly narrow in on these individual components, it will be understood that these operations may be repeated in any suitable way to similarly cover each image of the set of source images, each object of the one or more objects, and so forth. An example algorithm described below will illustrate how nested loops may allow system 100 to process each 3D point, contour, and image in the ways that have been described in method 200 for a specific minimal set of components (e.g., the singular instance-wise semantic mask of the singular particular source image, etc.).

Figure 3:
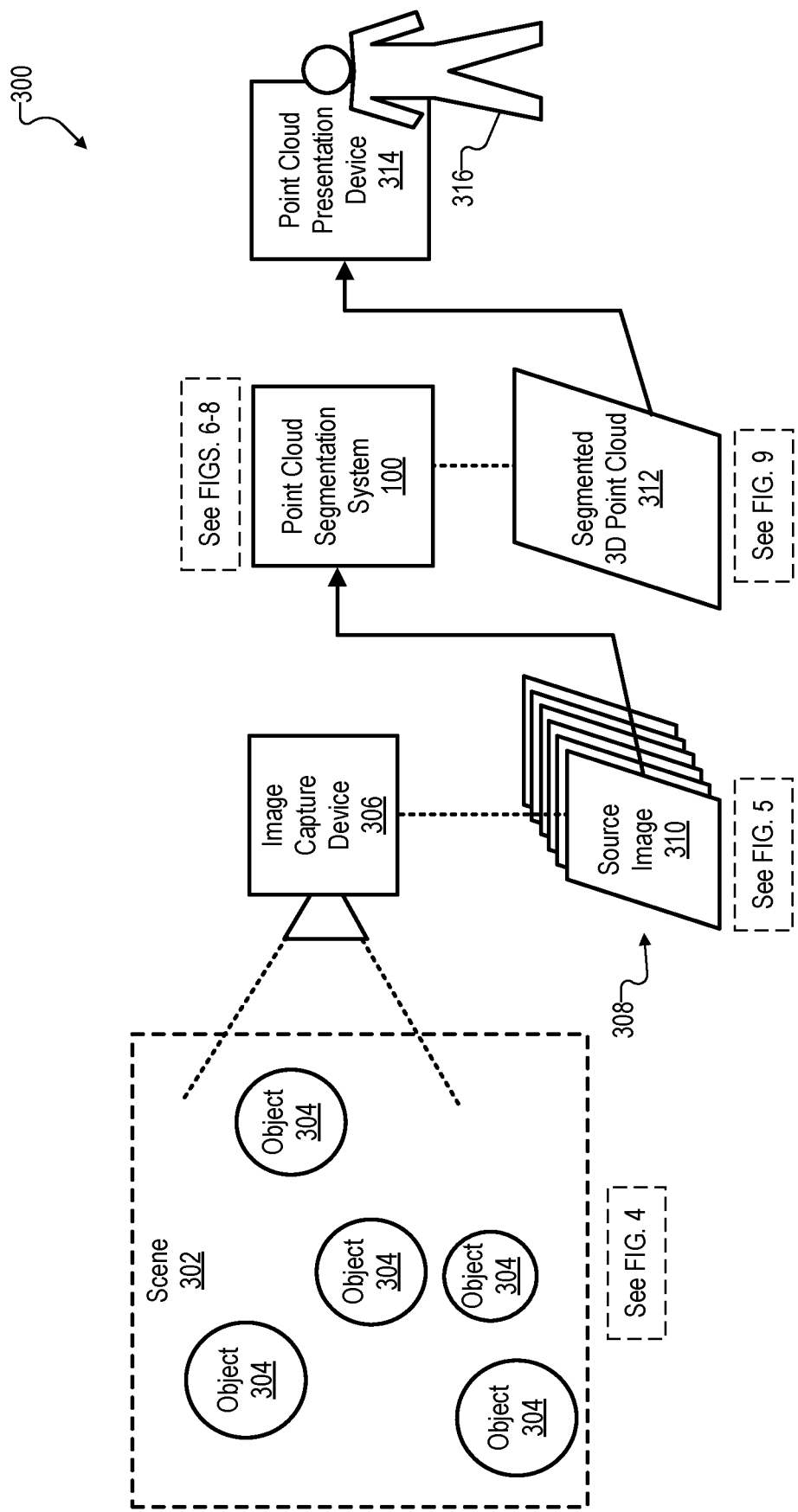
FIG. 3 shows an illustrative configuration in which an illustrative point cloud segmentation system may construct and perform instance-wise segmentation of a 3D point cloud in accordance with principles described herein.

FIG. 3 shows an illustrative configuration 300 in which an example implementation of point cloud segmentation system 100 may construct and perform instance-wise segmentation of a 3D point cloud in accordance with principles described herein. As shown, configuration 300 includes a scene 302 that includes one or more objects 304 (i.e., various objects at the scene that may or may not be of interest for the purposes of a segmented point cloud). An image capture device 306 is shown to capture a set 308 of source images 310 depicting scene 302 and the objects 304 included therein. This set of source images 310 are shown in configuration 300 to be accessed by a particular implementation of system 100, which, as will be described and illustrated in more detail below, may be configured to use source images 310 both to construct and to semantically segment a 3D point cloud in accordance with principles described herein. The output of these processes, as shown in configuration 300, may be a segmented 3D point cloud 312 which may be accessed and presented or otherwise used in some way by a point cloud presentation device 314 used by a user 316.

Various principles relating to instance-wise segmentation of 3D point clouds based on segmented 2D images will now be described in relation not only to FIG. 3 but also with reference to FIGS. 4-9. Specifically, as illustrated by dashed boxes near various elements of configuration 300, FIG. 3 will serve as a touchpoint by way of which various additional principles will now be described with reference to the other figures. For example, as shown, an example implementation of scene 302 and objects 304 will be described with reference to FIG. 4, certain aspects of the set 308 of source images 310 will be described with reference to FIG. 5, certain aspects of system 100 and the data it may produce as it performs functionality such as described above in relation to method 200 will be described with reference to FIGS. 6-8, and certain aspects of segmented 3D point cloud 312 will be described with reference to FIG. 9.

Scene 302 is illustrated as a box and objects 304 are illustrated by circles in FIG. 3, but it will be understood that these components may be implemented in any suitable way as may serve a particular implementation. For example, in certain circumstances, scene 302 may be located in an area that is difficult for humans to access due to one or more physical characteristics of the area. Scene 302 could include a platform atop a cell tower, for instance, which may be difficult (e.g., expensive, inconvenient, dangerous, etc.) for humans to access due to a height of the cell tower. In other examples, scene 302 could be in a body of water (e.g., a portion of a pipeline running along the ocean floor, etc.), under a bridge, on the side of a tall building or other structure, on a satellite or celestial body outside of the earth (e.g., the moon, Mars, a meteor, etc.), or in some other inconvenient or inaccessible place. In still other examples, scene 302 may be located in areas that are easily and conveniently accessible, such as in a room or other area occupied by user 316 with the point cloud presentation device 314 he or she is using.

The objects 304 found at scene 302 may depend on what type of scene is being captured. For example, as has been mentioned, various radio antennas (e.g., cellular antennas), electrical equipment, and/or other such objects may be found atop a cell tower. Other objects of interest will be different in other scenes that have been mentioned and will be understood to depend on the application or use case being implemented. Any or all of these objects will be represented by the generic circles depicted as objects 304 in FIG. 3.

Figure 4:
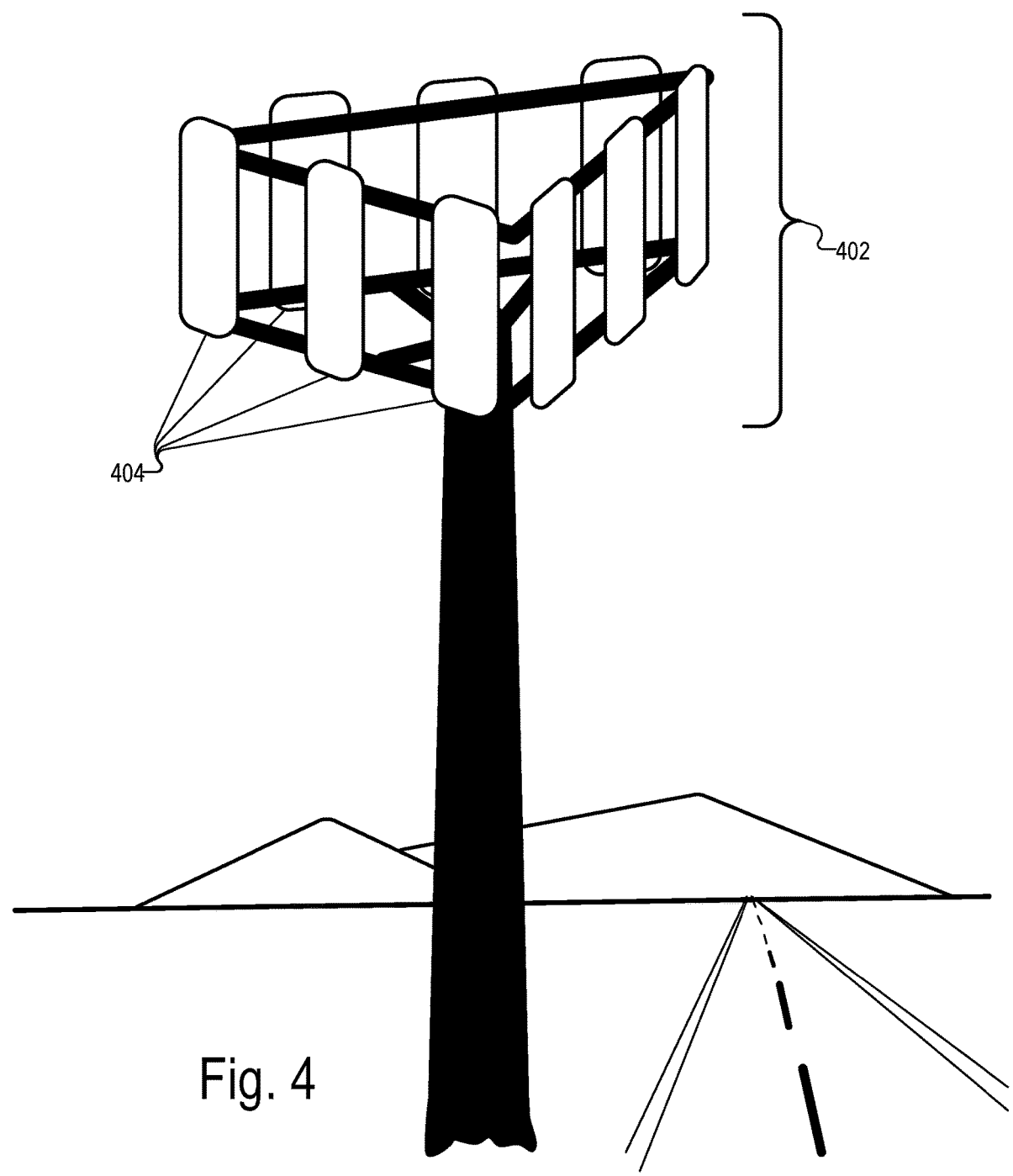
FIG. 4 shows an illustrative scene incorporating objects in an area that is difficult for humans to access in accordance with principles described herein.

To illustrate one particular example of a scene 302 that is difficult for humans to access, FIG. 4 shows an example scene 402 atop a cell tower that is difficult to access due to a height of the cell tower. As shown, scene 402 incorporates various objects 404 on a platform of the cell tower. While only one such platform is shown in this example, it will be understood that more than one platform on a single cell tower may each include distinct sets of such objects 404 and may be captured as a single scene or as multiple separate scenes. Objects 404 may represent any of the types of objects that may commonly be found on a cell tower platform. For instance, the one or more objects 404 may include a plurality of cellular antennas (e.g., 5G antennas, 4G antennas, etc.), other radio antennas (e.g., for television, microwave transmissions, etc.), electrical or other equipment associated with the antennas (e.g., cables, pipes, etc.), structural supports (e.g., ladders or walkways configured for use by maintenance technicians, etc.), and so forth.

As has been mentioned, the cell tower implementation illustrated in FIG. 4 (and which will be carried through to other examples described below) is selected since it provides a good example of a scene in which having a segmented point cloud of the various objects 404 may be of use. For instance, a company that manages and maintains the tower may benefit by having a digital representation of the platform with properly scaled representations of each object so that it may be determined, for example: what objects are present on the tower; whether those objects 404 have been affected (e.g., since a previous point cloud was generated) by storms or other weather, by vandalism, or by other forces (e.g., animal interference, etc.); how much space the objects 404 take up and whether there is room for additional objects; whether the objects 404 are oriented properly; and so forth. All of these questions may be difficult to answer if a person must physically go to the top of the tower or even if a drone or other machine is able to fly around and capture a video transmission of the scene. However, if a 3D point cloud can be generated and segmented based on principles described herein, all of these questions may be answered much more conveniently and accurately by reference to the segmented digital model of the scene.

Another advantage of the cell tower example is that the types of objects 404 likely to be of interest on a cell tower are objects that are probably not of significant interest to the general population and therefore not the subject of readily obtainable machine learning models and segmentation networks. Even if 3D segmentation networks exist for segmenting vehicles and other objects likely to be found on a road scene (e.g., for use with self-driving vehicles, etc.), it is unlikely that such networks would be trained to recognize the cellular antennas and other equipment found in a scene like scene 402.

Returning to FIG. 3, image capture device 306 is shown to be capturing set 308 of source images 310 depicting scene 302 (e.g., the cell tower scene 402 shown in FIG. 4 in one example). Image capture device 306 may include or be implemented by a video camera, a still camera, a combination image/depth capture device (e.g., using LIDAR scanning equipment or other depth capture technologies in combination with a camera), or any other suitable device for capturing image data represented in source images 310.

For scenes 302 that happen to be located in areas difficult for humans to access, due to physical characteristics of the areas such as height, remoteness, being under water, being in war zones or other dangerous or politically unstable locales, etc.), the set 308 of source images 310 may be captured using a machine configured to overcome the physical characteristics to gain access to the area. For example, image capture device 306 may be integrated in a machine configured to fly to a suitable height (e.g., a photographic drone), to travel to a remote area (e.g., a space probe), to dive to a suitable underwater depth (e.g., an unmanned submersible), to enter a relatively dangerous locale (e.g., an unmanned aerial or ground vehicle), or the like. In the example of scene 402 atop the cell tower, for instance, image capture device 306 may overcome the height of the cell tower by being implemented as a drone configured with photography and/or videography capabilities and that is configured to fly up to the platform and capture imagery (e.g., still or video imagery) of objects 404 all around the tower.

Figure 5:
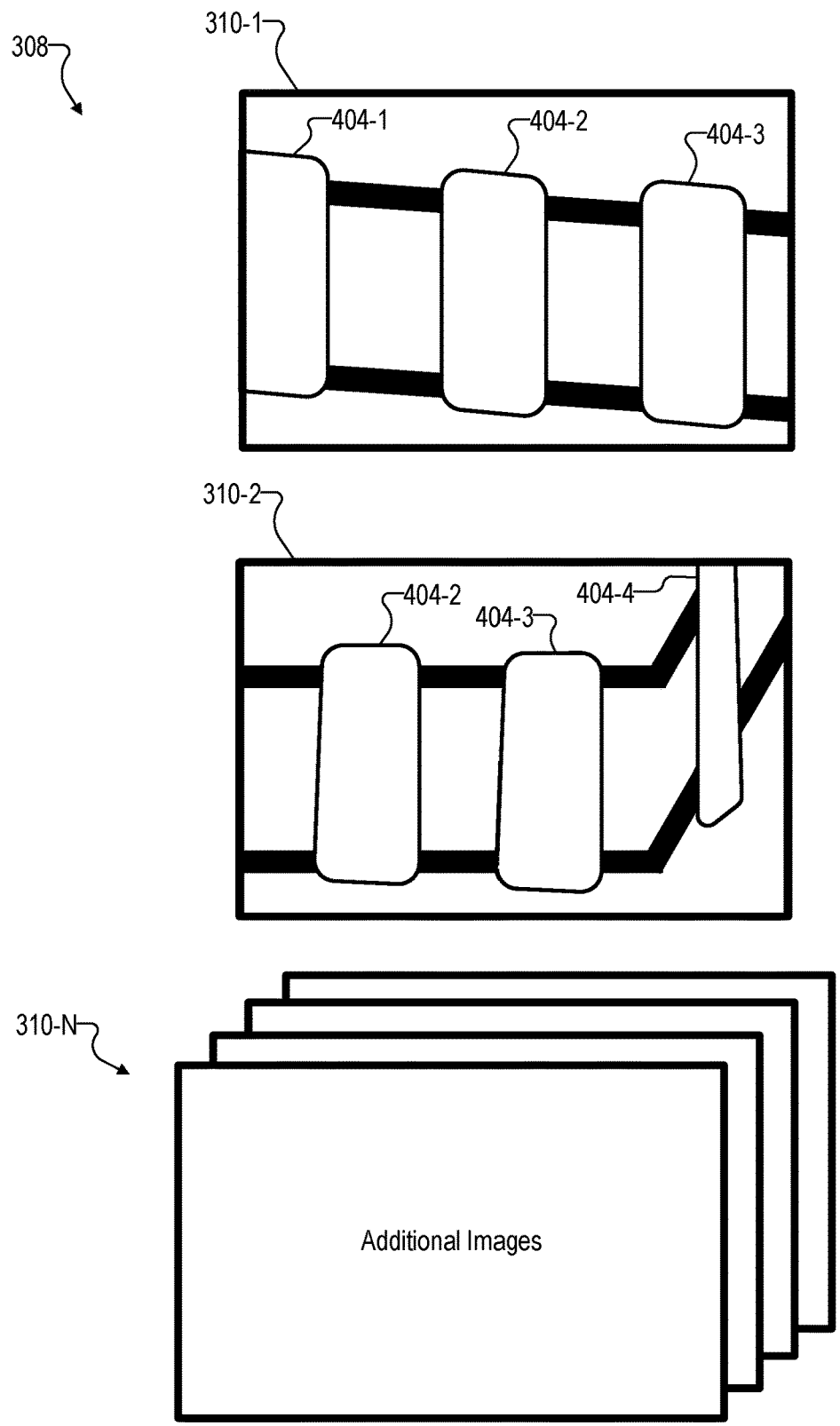
FIG. 5 shows illustrative aspects of an example set of source images depicting the scene of FIG. 4 in accordance with principles described herein.

To illustrate, FIG. 5 shows illustrative aspects of an example set 308 of source images 310 depicting the cell tower scene 402 of FIG. 4 in accordance with principles described herein. As shown, for example, a first source image 310-1 shows scene 402 from a first vantage point and depicts objects 404-1, 404-2, and 404-3 from that vantage point. Objects 404-1 through 404-3 will be understood to represent cellular antennas or other such objects in this example and structural elements (illustrated as black bars in this example) are also depicted in the image to be holding the objects in place. A second source image 310-2 shows scene 402 from a second vantage point. From this second vantage point, it can be seen that object 404-1 is not visible. However, objects 404-2 and 404-3 are depicted from a slightly different angle than they were depicted in source image 310-1, and an additional object 404-4 is also partially shown. Source images 310-1 and 310-2 are shown only by way of illustration, and it will be understood that a variety of additional source images 310-N may show scene 402 from a variety of additional vantage points as may serve a particular implementation. For example, several dozen or hundreds of source images may be captured (e.g., by a drone integrated with image capture device 306) from a variety of vantage points around the platform of the cell tower. In this way, each object 404 (e.g., including objects 404-1 through 404-4 shown in these particular images, as well as various other objects 404 present at the scene) may be captured sufficiently that a 3D point cloud may be generated based on the images.

Returning to FIG. 3, the set 308 of source images 310 (e.g., including the specific source images 310-1 and 310-2, as well as any other source images 310-N as may be included in set 308) is shown to be provided to and/or accessed by the illustrated implementation of system 100. A generalized architecture of system 100 was described above in relation to FIG. 1 and example functionality performed by system 100 was described in relation to FIG. 2. Additional details for how this particular example implementation of system 100 may function will now be described in the context of the ongoing cell tower example.

Figure 6:
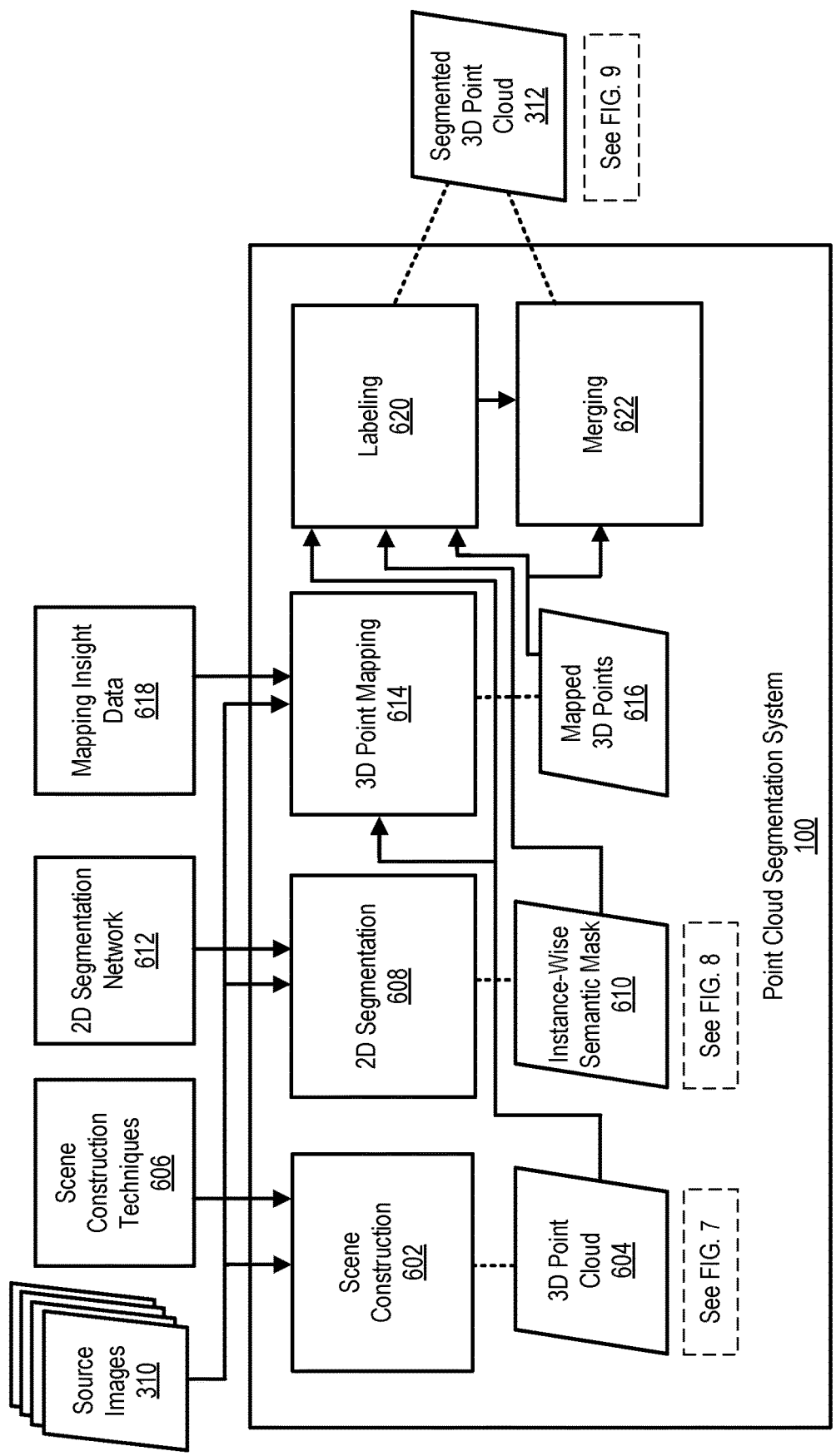
FIG. 6 shows illustrative implementation details by way of which a point cloud segmentation system may construct and perform instance-wise segmentation of a 3D point cloud in accordance with principles described herein.

FIG. 6 shows illustrative implementation details by way of which system 100 may construct and perform instance-wise segmentation of a 3D point cloud in accordance with principles described herein. As shown, a variety of functions (represented as rectangles within the implementation of system 100 shown in FIG. 6) may be influenced by or operated based on certain data inputs or technology assists (shown above system 100 in FIG. 6) to produce a variety of intermediate and final datasets (represented by parallelograms in FIG. 6). More particularly, a scene construction function 602 may produce a 3D point cloud 604 based on source images 310 (described above) and using one or more scene construction techniques 606. A 2D segmentation function 608 may produce instance-wise semantic masks 610 based on source images 310 and using a 2D segmentation network 612. A 3D point mapping function 614 may then generate mapped 3D points 616 based on the source images 310 and mapping insight data 618 (e.g., stored 2D-3D mappings between 2D keypoints and 3D points of a sparse 3D point cloud, a transform that was discovered in the process of constructing a dense 3D point cloud, etc.). A labeling function 620 and a merging function 622 may be performed using any or all of these other datasets that have been produced and the end result of these functions, as mentioned above and as also shown in FIG. 3, may be segmented 3D point cloud 312.

Figure 7:
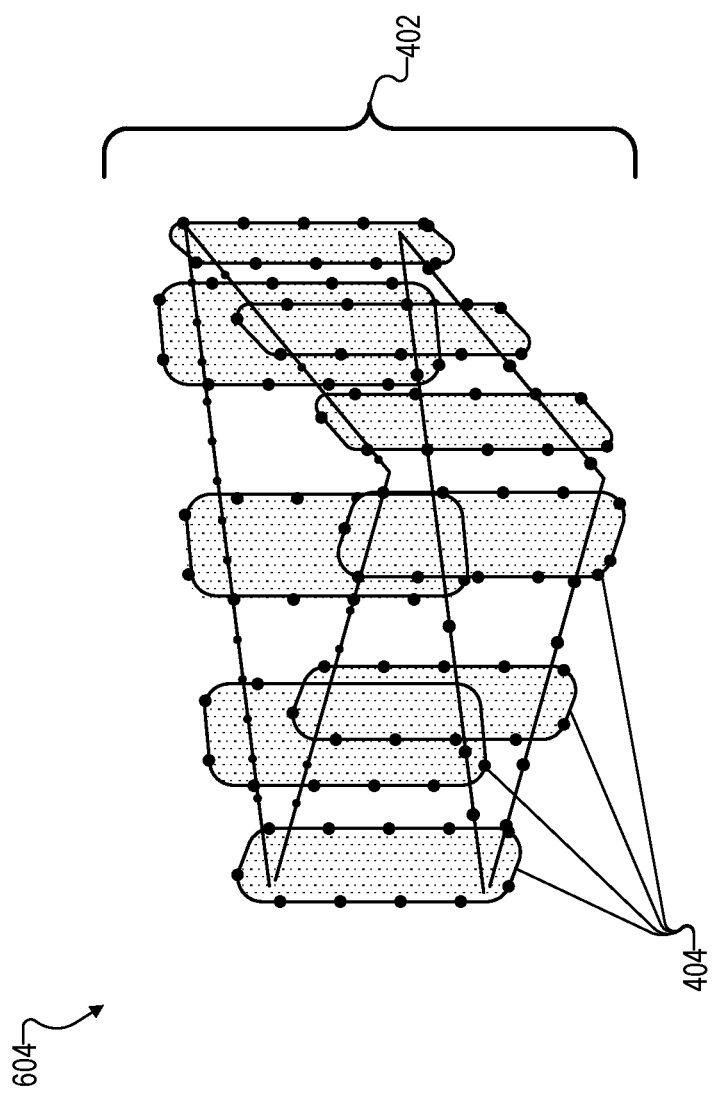
FIG. 7 shows illustrative aspects of an example 3D point cloud representative of objects at the scene of FIG. 4 prior to segmentation in accordance with principles described herein.
Figure 8:
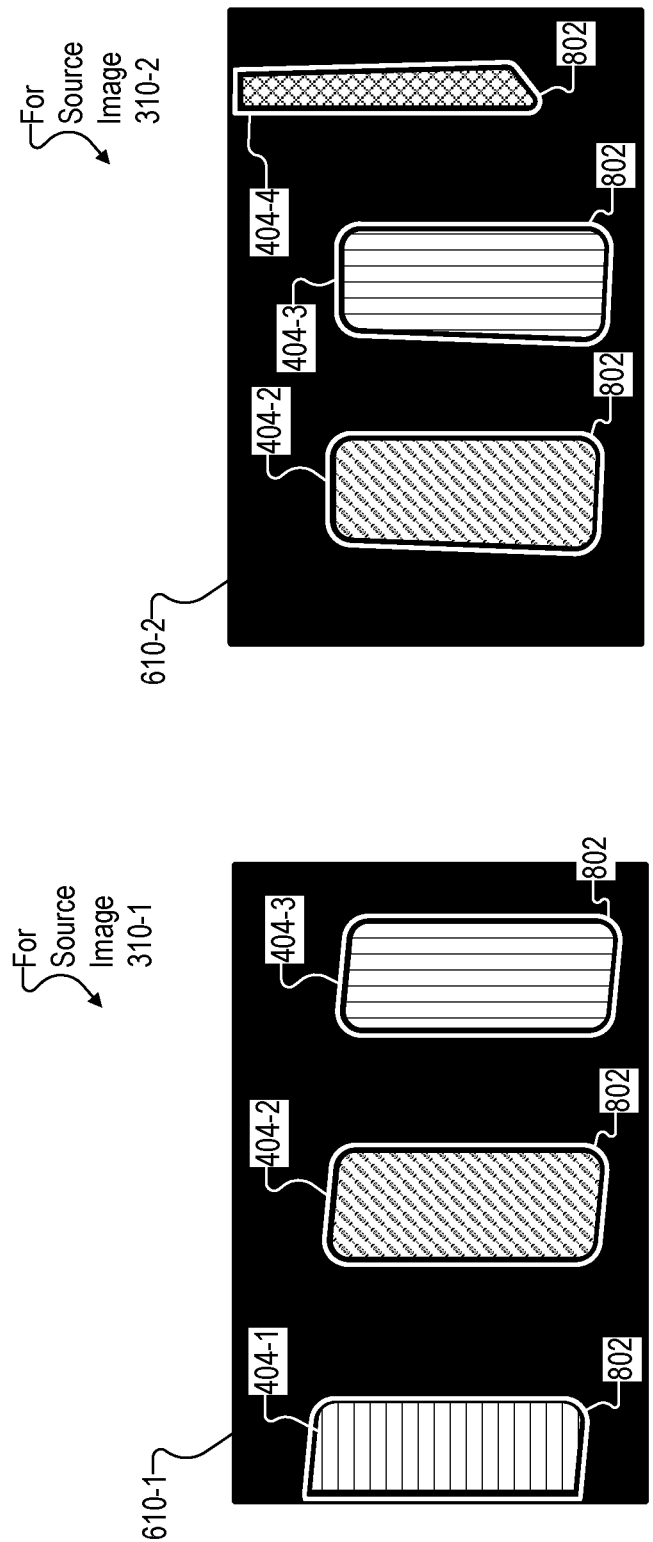
FIG. 8 shows illustrative aspects of example instance-wise semantic masks for source images such as those shown in FIG. 5 in accordance with principles described herein.

Each of the aspects of system 100 shown in FIG. 6 will now be described in more detail. Similarly as described above in relation to FIG. 3, certain elements will be described with reference to additional figures that are indicated in dashed boxes near the elements (e.g., FIG. 7 illustrating certain aspects of 3D point cloud 604, FIG. 8 illustrating certain aspects of instance-wise semantic masks 610, etc.).

Scene construction function 602 is shown to use the set of source images 310 and one or more one or more scene construction techniques 606 to produce 3D point cloud 604. For example, system 100 may perform scene construction function 602 by constructing 3D point cloud 604 based on the set of source images 310 and using at least one of: 1) a multi-view stereo scene construction technique; 2) a structure-from-motion scene construction technique; 3) a time-of-flight scene construction technique; or another suitable scene construction technique 606. Regardless of the scene construction approach or technology that is employed, source images 310 captured from various vantage points (such as illustrated in relation to FIG. 5) may be analyzed in a manner that allows for depth data to be determined for keypoints (e.g., readily identifiable features of objects 404 such as corners, edges, etc.) that are identifiable in multiple source images 310. A depth map of these keypoints may constitute what is referred to herein as a "sparse" point cloud. In certain examples, depth data associated with additional points (e.g. for surfaces between the keypoints) may also be determined (e.g., based on the depth mapping of the keypoints). A depth map of this more comprehensive set of points may represent surfaces of objects 404 in a relatively granular and high-resolution manner and may constitute what is referred to herein as a "dense" point cloud. Various scene constructions techniques 606 (e.g., including certain techniques mentioned herein) may be used to generate sparse and/or dense 3D point clouds in any manner as may serve a particular implementation.

Scene construction function 602 is shown to be performed by system 100 in this example, though it will be understood that, in certain implementations, scene construction function 602 may instead be performed by a separate scene construction system that is separate from (and communicatively coupled to) the point cloud segmentation system 100 performing the segmentation functions. In either case, it is noted that the same source images 310 may be employed for both scene construction functions (e.g., scene construction function 602) and for other segmentation-related functions (e.g., 2D segmentation function 608 and 3D point mapping function 614, etc.). As will be described in more detail below, this multi-function use of the source images 310 may result in a known mapping between 2D keypoints of source images 310 and 3D points of 3D point cloud 604 (e.g. for a sparse point cloud example), a known transform allowing arbitrary 2D points of the source images 310 to be correlated with 3D points of 3D point cloud 604 (e.g., for a dense point cloud example), or other such mapping insight data 618 that may enable or assist with 3D point mapping function 614. After scene construction function 602 has been performed, for example, respective transformation functions represented by mapping insight data 618 may map each of the keypoints or other 2D features depicted in the various source images 310 to a world coordinate space used by 3D point cloud 604.

As mentioned above, FIG. 7 shows illustrative aspects of an example implementation of 3D point cloud 604. This illustration continues with the cell tower example that has been used above and conceptually illustrates how 3D point cloud 604 may represent objects 404 at scene 402 prior to point cloud segmentation. Specifically, as shown, a variety of relatively large points around the edges of each object 404 may represent keypoints that have been identified in multiple source images 310 and used to determine these 3D points using suitable depth detection techniques. As mentioned above, some implementations of 3D point cloud 604 may be sparse point clouds in which the set of 3D points of the point cloud is limited to 3D points corresponding to 2D keypoints identified in the set of source images 310 to be associated with prominent features of scene 402. In such implementations, it will be understood that only these larger points around the edges of objects 404 would be included in the point cloud. Conversely, other implementations of 3D point cloud 604 may comprise dense point clouds in which these larger points corresponding to the 2D keypoints are supplemented by large numbers of the smaller points shown to texture the surface of each of objects 404 (illustrated as a dotted fill pattern in FIG. 7). In such implementations, the dense 3D point cloud 604 would have a set of 3D points that includes both: 1) the 3D points corresponding to the 2D keypoints identified in set 308 of source images 310 to be associated with the prominent features of scene 402; and 2) additional 3D points located between the 3D points corresponding to the 2D keypoints (illustrated in this representation by a dotted texture filling in the surfaces of objects 404). As will be described and made apparent, one advantage of using principles described herein for instance-wise segmentation of a 3D point cloud based on segmented 2D images is that either a sparse or a dense 3D point cloud may be semantically segmented using these principles.

Returning to FIG. 6, 2D segmentation function 608 is shown to use the same set 308 of source images 310 as was used by scene construction function 602 to produce a respective instance-wise semantic mask 610 for each source image 310 (only one mask 610 is explicitly shown in this example). As shown, 2D segmentation function 608 may utilize a suitable 2D segmentation network 612 to generate the instance-wise semantic masks. For example, the generating of each instance-wise semantic mask 610 may be performed using a commercially-available technology for 2D image segmentation such as any segmentation networks, machine learning models, deep learning models, etc., as have been mentioned herein or as may serve a particular implementation. Certain such tools may be configured to recognize and identify a variety of objects depicted in 2D images (up to and including relatively uncommon objects such as objects 404). Other tools may allow for training data to be easily compiled by, for example, facilitating manual annotation of 2D images that a user may have available to illustrate the objects of interest in a variety of contexts. Regardless of whether custom/proprietary 2D segmentation technologies, commercially-available technologies, or a combination of the two are used, 2D segmentation network 612 may be well-adapted to semantically segment objects of interest (e.g., objects 404 in this example) as they are depicted in 2D images such as source images 310. It will be recognized by those of ordinary skill that such tools and models (i.e., for 2D semantic segmentation of particular objects of interest) are more readily built, acquired, trained, and so forth (e.g., from commercial sources, open-source projects, etc.) than tools and models for 3D point cloud segmentation would be.

As has been described, an instance-wise semantic mask for a particular 2D image may indicate, for each object instance fully or partially depicted in the image, which pixels correspond to the object instance. In this way, respective contours around the boundary of each object instance may be generated (e.g., drawn, computed, etc.) such that pixels corresponding to that object instance are encompassed or enclosed within the contour.

To illustrate, FIG. 8 shows illustrative aspects of example instance-wise semantic masks 610 for source images 310 such as those shown in FIG. 5. More specifically, as shown, a first instance-wise semantic mask 610-1 is shown to correspond to the first source image 310-1 illustrated and described in relation to FIG. 5 ("For Source Image 310-1"), while a second instance-wise semantic mask 610-2 is shown to correspond to the second source image 310-2 that was illustrated and described in relation to FIG. 5 ("For Source Image 310-2"). Each of the objects 404 depicted in source images 310-1 and 310-2 are represented in instance-wise semantic masks 610. Specifically, different fill patterns (i.e., colors, hash styles, etc.) are utilized in FIG. 8 to indicate how different groupings of pixels in the source images correlate with objects 404 (e.g., a horizontal hash fill pattern for pixels associated with object 404-1, a one-way diagonal hash fill pattern for pixels associated with object 404-2, a vertical hash fill pattern for pixels associated with object 404-3, and a two-way diagonal hash fill pattern for pixels associated with object 404-4). Around each of these groupings of pixels identified to be associated with their respective objects 404, different contours 802 are also shown. Areas outside of contours 802 are shaded in black. The instance-wise semantic masks 610 will be understood to indicate that pixels in these black-shaded areas do not correspond to (e.g., help depict) any of the objects of interest in the figures.

Returning to FIG. 6, 3D point mapping function 614 is shown to take in the same set of source images 310 as has been used by functions 602 and 608 and to use mapping insight data 618 to map 3D points 616 from 3D point cloud 604 onto each of the source images 310. As mentioned above, the constructing of 3D point cloud 604 based on the set of source images 310 may include accessing a predetermined 2D-3D mapping of keypoints (e.g., for a sparse point cloud) or determining respective transformations between respective 2D image spaces of each particular source image 310 and a 3D world space associated with scene 402 (e.g., for a dense point cloud). Mapping insight data 618 is shown in FIG. 6 to represent any of these types of insights (e.g., any information indicative of the relationship between one 2D image space of one source image to the 3D world space). Accordingly, as shown, the mapping of the set of 3D points from 3D point cloud 604 onto that source image 310 (i.e., the carrying out of 3D point mapping function 614) may be performed based on these insights (e.g., the 2D-3D mapping, the transformation between the 2D image space and the 3D world space, etc.). Just as respective instance-wise semantic masks may be generated for each source image 310, so too may a unique 2D-3D mapping and/or transform be determined for each respective source image 310 to the unified world space with respect to which the 3D point cloud is defined.

Based on the mapping of the sparse or dense 3D points onto a particular source image 310, labeling function 620 may be performed. Specifically, as shown, labeling function 620 takes in 3D point cloud 604, instance-wise semantic mask 610, and mapped 3D points 616, then proceeds to label each of the mapped 3D points in accordance with where each mapped 3D point is positioned with respect to contours 802. For example, if a 3D point mapped onto source image 310-1 is located within the contour 802 of the mask of object 404-1 when instance-wise semantic mask 610-1 is applied to source image 310-1, this 3D point would be labeled as being associated with (i.e., corresponding to) object 404-1. Similarly, if another 3D point mapped onto source image 310-2 is located within the contour 802 of the mask of object 404-2 when instance-wise semantic mask 610-2 is applied to source image 310-2, this other 3D point would be labeled as being associated with object 404-2. In this way, each of the mapped 3D points 616 may be labeled in accordance with what objects of interest they are associated with.

Because each of the source images 310 may be processed independently with respect to their own local 2D image space, it may not be inherently clear that a mapped 3D point that is correlated to a first object based on the analysis of a first source image and that is further correlated to a second object based on the analysis of a second source image is actually correlated to the same object in both cases. In other words, it may be useful or necessary to perform steps that merge or combine objects depicted in different source images 310 together when it can be determined that the different source images actually depict the same object instances. The correlating of objects that are represented once in 3D point cloud 604 while being depicted by a plurality of source images 310 is the objective of merging function 622.

At merging function 622, system 100 may identify a correlation between: 1) a first group of the mapped set of 3D points 616 that are each labeled (by labeling function 620 based on the contours defined by one instance-wise semantic mask 610) as being associated with a first object 404, and 2) a second group of 3D points mapped from 3D point cloud 604 to corresponding 2D points of a different source image 310 and that are each labeled (by labeling function 620 based on contours defined by another additional instance-wise semantic mask 610 for the different source image 310) as being associated with a second object 404. Based on this correlation, system 100 may determine (as part of merging function 622) that the first and second objects 404 are actually a same object 404 (e.g., object 404-2 as seen from the different vantage points of source images 310-1 and 310-2, for example). Then, based on the determining that the first and second objects are the same object, system 100 may merge the first group and the second group to be labeled in a way that indicates they are associated with the same object.

This merging function 622 may be done based on any suitable analysis and using any suitable technique. As one example, the merging may be performed based on a determination that certain 3D points being analyzed have already been labeled (based on an analysis of another image) to correspond to a particular object. More particularly, for instance, the identifying of the correlation in the description above may include determining, during the labeling of the mapped set of 3D points, that a first mapped 3D point of the first group is already labeled as being associated with the second object. As another example, the merging may be performed based on detecting geometric commonality between independently labeled groups of points. More particularly, for instance, the identifying of the correlation may include identifying a geometric overlap between the first group and the second group within a 3D world space with which the 3D point cloud is associated. The geometric overlap identified may include, for instance, overlapping bounding boxes or centroids of the objects, or any other insight leading to the conclusion that one object is positioned in the same 3D location as another object and that they therefore must be the same object. In some cases, this geometric overlap technique may allow for a first object depiction in a first source image to be correlated with a second object depiction in a second source image (i.e., to be identified as depicting the same physical object) even if the first and second object depictions have no overlap (e.g., even if the object is depicted from the front and the back and there are no keypoints in common in the different depictions).

In certain examples, the various source images 310 depicting the objects that are to be consolidated and merged in these ways (i.e., because the depictions of the objects in the different source images represent the same physical objects as viewed from different vantage points) may be captured independently from one another. For instance, a drone may fly up to a cell tower platform and be directed to capture several still images from different perspectives that are manually selected by a person controlling the drone. Merging techniques described above may be ideal for such independent source images. However, in other examples, source images 310 may not be so independent from one another, but, rather, may have some known relationship with one another. For instance, source images 310 may be frames of a video that is captured while a capture device is moving in the vicinity of a scene, such that the vantage point of one frame may have a known relationship to (or may at least be expected to be substantially similar to) a vantage point of the subsequent frame. In this type of example, the merging techniques described above may also be used, but other techniques may be configured to take advantage of the known relationship between the source images. For instance, video semantic segmentation models may be utilized to track object instances across frames of the video, such that, once an object is identified in one frame, it can more readily be identified as the same object when it appears in subsequent frames.

As illustrated in FIG. 6, once the mapped 3D points are labeled (labeling function 620) and groups of points are properly merged (merging function 622), the result may be segmented 3D point cloud 312. As was further illustrated in FIG. 3, this segmented 3D point cloud 312 produced by system 100 may be considered the final product of system 100. For example, as illustrated in FIG. 3 and as will be described in more detail below, segmented 3D point cloud 312 may be provided to point cloud presentation device 314 for presentation and use by user 316 in various ways described herein. As another example, this final product of system 100 may constitute, or may be used to generate, 3D segmentation training data (which, as described above, may otherwise be difficult to obtain, particularly for uncommon objects). Rather than, or in addition to, being presented to user 316, such 3D segmentation training data may be used to help train a direct 3D point cloud segmentation algorithm or used in other suitable ways. Certain aspects of segmented point cloud 312 will now be described in relation to FIG. 9.

Figure 9:
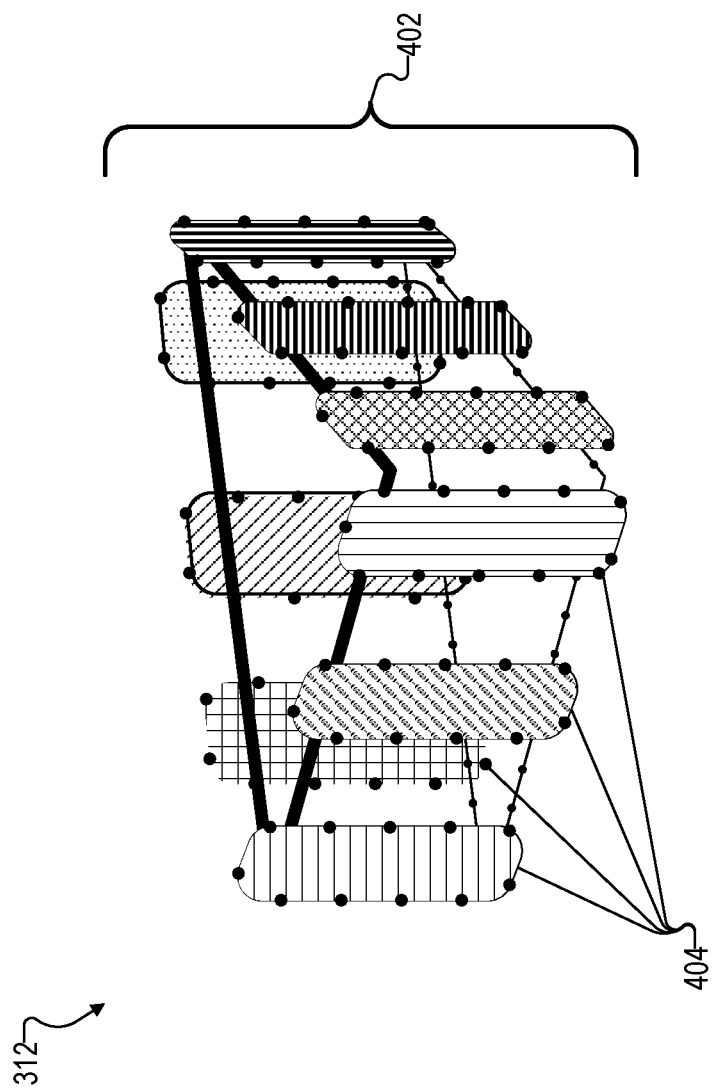
FIG. 9 shows illustrative aspects of an example segmented 3D point cloud representative of objects at the scene of FIG. 4 in accordance with principles described herein.

FIG. 9 is shown to be similar to FIG. 7, which illustrated aspects of 3D point cloud 604 as generated based on the source images, but prior to the 3D segmentation. Like FIG. 7, FIG. 9 shows the example scene 402 at the cell tower platform with the various objects 404 representing, for instance, cell antennas and/or other such objects of interest. However, whereas the 3D point cloud 604 shown in FIG. 7 did not differentiate one object 404 from another (i.e., each was drawn with an identical dotted fill pattern indicating a homogenous collection of 3D points without semantic labels indicative of which objects 404 they belonged to), the segmented 3D point cloud 312 shown in FIG. 9 shows fill patterns that do differentiate objects 404 from one another in an instance-wise manner. For example, as shown, one object 404 features a diagonal fill pattern in one direction, another features a different diagonal fill pattern in the other direction, another has bi-directional diagonal cross hatching, and still others feature horizontal fill patterns, vertical fill patterns and so forth. These fill patterns will be understood to represent the semantic labeling that is incorporated into this 3D point cloud. That is, each 3D point corresponding with each of the different objects 404 may be labeled in accordance with which particular object instance the 3D point corresponds to. In this way, all the 3D points associated with one particular object (e.g., 3D points associated with the object drawn with the vertical fill pattern) may be analyzed apart from 3D points associated with other objects to accomplish any of the objectives or use cases that have been described.

Returning to FIG. 3, segmented 3D point cloud 312 is shown to be provided to and/or otherwise accessed by point cloud presentation device 314, which is shown to be used by user 316 and which will be understood to present or otherwise make use of the segmented 3D point cloud in any suitable way. For example, point cloud presentation device 314 may be implemented by a computing device (e.g., a computer workstation, a mobile device, etc.) that uses segmented 3D point cloud 312 to track an individual status for each of the one or more objects 304, to determine an individual physical characteristic for a particular object 304 of the one or more objects 304, or to otherwise make use of the point cloud in any suitable way. Using the antenna objects 404 as an example, for instance, point cloud presentation device 314 may track the status of each antenna from day to day (or week to week, month to month, etc.) as weather events and/or other circumstances may cause the antennas to be physically moved or altered in ways that may be of interest to user 316 (e.g., in case user 316 desires to address changes by, for example, readjusting an antenna that is reoriented during a wind storm). As another example, point cloud presentation device 314 may determine individual physical characteristics for antenna objects 404 by, for instance, measuring the size of a particular antenna object, measuring the distance between two specific antenna object instances (or other equipment), and so forth. This may help user 316 to perform planning activities (e.g., to determine if there is space for certain additional equipment on the platform, etc.), inventorying activities, and so forth. In still other examples, point cloud presentation device 314 may present or utilize segmented 3D point cloud 312 in any other manner as may serve a particular use case or as user 316 may direct.

Figure 10:
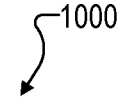
FIG. 10 shows illustrative pseudo-code for implementing an example algorithm for instance-wise segmentation of a 3D point cloud based on segmented 2D images in accordance with principles described herein.

FIG. 10 shows illustrative pseudo-code that may indicate or approximate a particular algorithm 1000 for instance-wise segmentation of a 3D point cloud based on segmented 2D images in accordance with one particular implementation. For example, algorithm 1000 may be used by system 100 to perform the functionality described above.

As shown, algorithm 1000 refers to several inputs including "images" (e.g., the plurality of source images 310), "points2D" (e.g., a 2D-3D mapping of 3D points from a point cloud to their corresponding 2D points in the source images, such as described in relation to 3D point mapping function 614), "sparce_pc" (e.g., a sparse point cloud that has been constructed), an optional "dense_pc" (e.g., a dense point cloud constructed based on the sparse point cloud), and "extrinsics" (e.g., information about the poses of image capture devices used to captured the images with respect to the world coordinate space of the scene, such as represented by mapping insight data 618). Algorithm 1000 may ultimately use these inputs to generate an output "points3D," which is a data structure that includes a mapping of 3D "points" each labeled with different "objectID" identifiers. For example, this output may represent a first object (e.g., a first antenna object 404) with a list of 3D points, a second object with its own list of 3D points, and so forth.

As indicated by comments in the pseudo-code, algorithm 1000 may begin by initializing points 3D to an empty map and initializing a data structure called "seen" to indicate that no point has yet been analyzed. This "seen" structure will be understood to serve as a performance enhancement that allows algorithm 1000 to avoid wasting time reanalyzing points that have already been processed.

After these initialization actions are performed, algorithm 1000 may begin a set of nested loops that process each of the source images (in the outer loop), each contour of the various objects depicted in each image (in the next looping layer), and each of the mapped points (in the innermost looping layer). More particularly, as shown, for each image, an object identifier is initialized and then 2D segmentation is performed to determine the contours of a mask. It is noted that in the event a dense point cloud is being used, the dense 3D points may first be mapped (e.g., reprojected) onto the images with the keypoints. Once the masks are generated and the contours of each object areccomputed, algorithm 1000 iterates through each contour and initializes a temporary point cloud. That way, as algorithm 1000 iterates through each mapped 3D point (e.g., whether from a sparse or dense point cloud), it may determine if the mapped point is within the contour and, if it is, whether it has already been processed (i.e., if the point is in the "seen" data structure). If it has already been seen, the object identifier that has already been identified is assigned. Otherwise, the 3D point is assigned to the temporary point cloud being generated for the object represented by the present contour and the point is marked has having been seen (i.e., processed/analyzed). Once the mapped points have all been analyzed for a contour in this way, geometric tests may be performed to determine if the object identifier should be merged with some object that has previously been seen ("find_matching_instance"). Finally, the 3D points labeled with this object identifier are added to the temporary point cloud for the object represented by the present contour and the algorithm moves on to the next contour (and, when the contours of one image are all processed in this way, moves on to the next image).

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
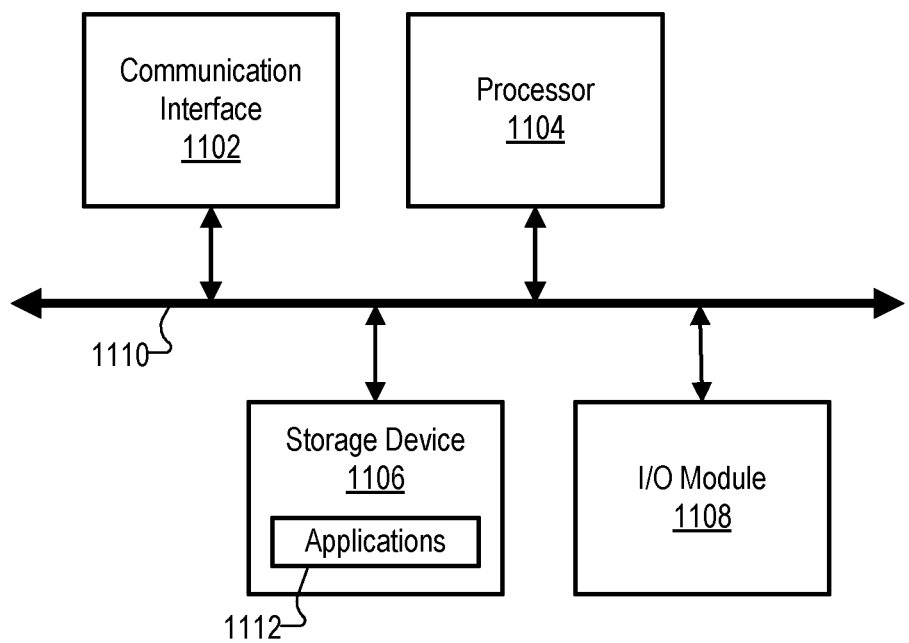
FIG. 11 shows an illustrative computing system that may implement point cloud segmentation systems and/or other computing systems described herein.

FIG. 11 shows an illustrative computing system 1100 that may implement point cloud segmentation systems and/or other computing systems described herein. For example, computing system 1100 may include or implement (or partially implement) point cloud segmentation systems such as any implementations of system 100 described herein, any of the components that they implement, devices used to capture image data and/or generate point clouds (e.g., image capture devices 306, etc.), devices that present or otherwise utilize point clouds (e.g., point cloud presentation device 314), and/or any other computing devices or systems described herein (or any elements or subsystems thereof).

As shown in FIG. 11, computing system 1100 may include a communication interface 1102, a processor 1104, a storage device 1106, and an input/output (I/O) module 1108 communicatively connected via a communication infrastructure 1110. While an illustrative computing system 1100 is shown in FIG. 11, the components illustrated in FIG. 11 are not intended to be limiting. Additional or alternative components may be used in other embodiments. Components of computing system 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1100. For example, one or more applications 1112 residing within storage device 1106 may be configured to direct processor 1104 to perform one or more processes or functions associated with processor 104 of system 100. Likewise, memory 102 of system 100 may be implemented by or within storage device 1106.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    generating, by a point cloud segmentation system, an instance-wise semantic mask for a particular source image of a set of source images that has been used to construct a 3D point cloud representing a scene that includes one or more objects;
    mapping, by the point cloud segmentation system, a set of 3D points from the 3D point cloud to corresponding 2D points of the particular source image;
    labeling, by the point cloud segmentation system based on contours defined by the instance-wise semantic mask to demarcate the one or more objects, the mapped set of 3D points in accordance with where the corresponding 2D point for each mapped 3D point is positioned with respect to the contours;
    identifying, by the point cloud segmentation system, a correlation between:
        a first group of the mapped set of 3D points that are each labeled, based on the contours defined by the instance-wise semantic mask, as being associated with a first object of the one or more objects, and
        a second group of 3D points mapped from the 3D point cloud to corresponding 2D points of an additional source image of the set of source images and that are each labeled, based on contours defined by an additional instance-wise semantic mask for the additional source image, as being associated with a second object of the one more objects;
    determining, by the point cloud segmentation system and based on the correlation, that the first and second objects are a same object; and
    merging, by the point cloud segmentation system and based on the determining that the first and second objects are the same object, the first group and the second group to be labeled as being associated with the same object.

2. The method of claim 1, further comprising constructing, by the point cloud segmentation system and based on the set of source images, the 3D point cloud representing the scene, the constructing including determining a transformation between a 2D image space of the particular source image and a 3D world space associated with the scene;
    wherein the mapping of the set of 3D points from the 3D point cloud to the corresponding 2D points of the particular source image is performed based on the transformation between the 2D image space and the 3D world space.

3. The method of claim 1, wherein the identifying of the correlation includes determining, during the labeling of the mapped set of 3D points, that a first mapped 3D point of the first group is already labeled as being associated with the second object.

4. The method of claim 1, wherein the identifying of the correlation includes identifying a geometric overlap between the first group and the second group within a 3D world space with which the 3D point cloud is associated.

5. The method of claim 1, wherein the mapping of the set of 3D points from the 3D point cloud to the corresponding 2D points of the particular source image includes accessing 2D-3D mapping data that is generated and stored as part of constructing the 3D point cloud based on the set of source images.

6. The method of claim 1, wherein the 3D point cloud is a sparse point cloud in which the set of 3D points is limited to 3D points corresponding to 2D keypoints identified in the set of source images to be associated with prominent features of the scene.

7. The method of claim 1, wherein the 3D point cloud is a dense point cloud and the set of 3D points includes both:
    3D points corresponding to 2D keypoints identified in the set of source images to be associated with prominent features of the scene; and additional 3D points located between the 3D points corresponding to the 2D keypoints.

8. The method of claim 1, further comprising constructing, by the point cloud segmentation system and based on the set of source images, the 3D point cloud based on at least one of:
a multi-view stereo scene construction technique;
a structure-from-motion scene construction technique; or
a time-of-flight scene construction technique.

9. The method of claim 1, wherein
the set of source images is captured using a machine configured to gain access to an area where the scene is located.

10. The method of claim 9, wherein:
the scene is atop a cell tower;
the one or more objects include a plurality of antennas; and
the machine is a drone configured with at least one of photography or videography capabilities.

11. The method of claim 1, further comprising producing, by the point cloud segmentation system based on the labeling of the mapped set of 3D points, a segmented 3D point cloud including an instance-wise segmentation of the one or more objects at the scene.

12. The method of claim 11, further comprising using the segmented 3D point cloud to perform at least one of:
tracking an individual status for each of the one or more objects; or
determining an individual physical characteristic for a particular object of the one or more objects.

13. A system comprising:
a memory storing instructions; and
one or more processors communicatively coupled to the memory and configured to execute the instructions to perform a process comprising:
generating an instance-wise semantic mask for a particular source image of a set of source images that has been used to construct a 3D point cloud representing a scene that includes one or more objects;
mapping a set of 3D points from the 3D point cloud to corresponding 2D points of the particular source image;
labeling, based on contours defined by the instance-wise semantic mask to demarcate the one or more objects, the mapped set of 3D points in accordance with where the corresponding 2D point for each mapped 3D point is positioned with respect to the contours;
identifying a correlation between:
a first group of the mapped set of 3D points that are each labeled, based on the contours defined by the instance-wise semantic mask, as being associated with a first object of the one or more objects, and
a second group of 3D points mapped from the 3D point cloud to corresponding 2D points of an additional source image of the set of source images and that are each labeled, based on contours defined by an additional instance-wise semantic mask for the additional source image, as being associated with a second object of the one more objects;
determining, based on the correlation, that the first and second objects are a same object; and
merging, based on the determining that the first and second objects are the same object, the first group and the second group to be labeled as being associated with the same object.

14. The system of claim 13, wherein the process further comprises constructing, based on the set of source images, the 3D point cloud representing the scene, the constructing including determining a transformation between a 2D image space of the particular source image and a 3D world space associated with the scene;
wherein the mapping of the set of 3D points from the 3D point cloud to the corresponding 2D points of the particular source image is performed based on the transformation between the 2D image space and the 3D world space.

15. The system of claim 13, wherein the 3D point cloud is a sparse point cloud in which the set of 3D points is limited to 3D points corresponding to 2D keypoints identified in the set of source images to be associated with prominent features of the scene.

16. The system of claim 13, wherein the 3D point cloud is a dense point cloud in which the set of 3D points includes both:
3D points corresponding to 2D keypoints identified in the set of source images to be associated with prominent features of the scene; and
additional 3D points located between the 3D points corresponding to the 2D keypoints.

17. The system of claim 13, wherein the process further comprises producing, based on the labeling of the mapped set of 3D points, a segmented 3D point cloud including an instance-wise segmentation of the one or more objects at the scene.

18. A non-transitory computer-readable medium storing instructions that, when executed, direct a processor of a computing device to perform a process comprising:
generating an instance-wise semantic mask for a particular source image of a set of source images that has been used to construct a 3D point cloud representing a scene that includes one or more objects;
mapping a set of 3D points from the 3D point cloud to corresponding 2D points of the particular source image;
labeling, based on contours defined by the instance-wise semantic mask to demarcate the one or more objects, the mapped set of 3D points in accordance with where the corresponding 2D point for each mapped 3D point is positioned with respect to the contours;
identifying a correlation between:
a first group of the mapped set of 3D points that are each labeled, based on the contours defined by the instance-wise semantic mask, as being associated with a first object of the one or more objects, and
a second group of 3D points mapped from the 3D point cloud to corresponding 2D points of an additional source image of the set of source images and that are each labeled, based on contours defined by an additional instance-wise semantic mask for the additional source image, as being associated with a second object of the one more objects;
determining, based on the correlation, that the first and second objects are a same object; and
merging, based on the determining that the first and second objects are the same object, the first group and the second group to be labeled as being associated with the same object.

19. The non-transitory computer-readable medium of claim 18, wherein the process further comprises constructing, based on the set of source images, the 3D point cloud representing the scene, the constructing including determining a transformation between a 2D image space of the particular source image and a 3D world space associated with the scene;
   wherein the mapping of the set of 3D points from the 3D point cloud to the corresponding 2D points of the particular source image is performed based on the transformation between the 2D image space and the 3D world space.

20. The non-transitory computer-readable medium of claim 18, wherein the process further comprises producing, based on the labeling of the mapped set of 3D points, a segmented 3D point cloud including an instance-wise segmentation of the one or more objects at the scene.

* * * * *